US009400738B2

(12) United States Patent
Carter et al.

(10) Patent No.: US 9,400,738 B2
(45) Date of Patent: *Jul. 26, 2016

(54) GENERATION OF AUTOMATED UNIT TESTS FOR A CONTROLLER LAYER SYSTEM AND METHOD

(71) Applicant: International Business Machines Corporation, Armonk, NY (US)

(72) Inventors: Bernadette A. Carter, Raleigh, NC (US); Pratyush Dhruv, Portland, OR (US); Corrie H Y Kwan, Markham (CA); Robert Retchless, North York (CA); Lauren J. Hayward Schaefer, Newark, DE (US); Cesar A. Wong, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,908

(22) Filed: Apr. 14, 2015

(65) Prior Publication Data

US 2016/0041898 A1  Feb. 11, 2016

Related U.S. Application Data

(63) Continuation of application No. 14/454,236, filed on Aug. 7, 2014.

(51) Int. Cl.
*G06F 9/44* (2006.01)
*G06F 11/36* (2006.01)
(52) U.S. Cl.
CPC ........ *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 8,359,579 B2 * | 1/2013 | Chapman | G06F 8/316 717/124 |
| 8,370,814 B2 | 2/2013 | Grechanik et al. | |
| 8,935,654 B2 * | 1/2015 | Sengupta | G06F 17/2705 700/91 |
| 2005/0256665 A1 * | 11/2005 | Hartmann | G06F 11/3688 702/121 |
| 2007/0110044 A1 * | 5/2007 | Barnes | G06F 17/30091 370/360 |

(Continued)

OTHER PUBLICATIONS http://docs.selemiunhq.org, "Selenium—Web Browser Automation", downloaded Apr. 22, 2014, 2 pages.

(Continued)

*Primary Examiner* — Wei Zhen
*Assistant Examiner* — Hossain Morshed
(74) *Attorney, Agent, or Firm* — Brian J. Colandreo, Esq.; Jeffrey T. Placker, Esq.; Holland & Knight LLP

(57) ABSTRACT

A method, computer program product, and computer system for receiving, by a computing device, a selection of one or more files for which to have one or more automated unit tests generated for an application under test. An action in the application under test is received while the application under test is used. Behavior data of how the application under test responds to the action is tracked. An automated unit test of the one or more automated unit tests is generated for underlying code of the application under test invoked when receiving the action based upon, at least in part, the behavior data of how the application under test responds to the action.

6 Claims, 7 Drawing Sheets

(56) References Cited

U.S. PATENT DOCUMENTS

| | | | |
|---|---|---|---|
| 2007/0220342 A1* | 9/2007 | Vieira | G06F 11/3688 714/33 |
| 2008/0115114 A1* | 5/2008 | Palaparthi | G06F 11/3688 717/128 |
| 2009/0018811 A1* | 1/2009 | Paradkar | G06F 11/3684 703/22 |
| 2011/0004868 A1* | 1/2011 | Bharadwaj | G06F 11/3676 717/135 |
| 2011/0231825 A1* | 9/2011 | Grechanik | G06F 11/368 717/126 |
| 2011/0314343 A1* | 12/2011 | Hoke | G06F 11/3696 714/45 |
| 2012/0254665 A1* | 10/2012 | Pasala | G06F 11/3684 714/33 |
| 2013/0042222 A1* | 2/2013 | Maddela | G06F 8/70 717/124 |
| 2013/0254746 A1* | 9/2013 | Balakrishnan | G06F 11/3608 717/124 |
| 2015/0074647 A1* | 3/2015 | Levi | G06F 11/3672 717/124 |
| 2015/0234731 A1* | 8/2015 | Williams | G06F 11/3684 717/126 |
| 2015/0261660 A1* | 9/2015 | Shiraishi | G06F 11/28 714/38.1 |

OTHER PUBLICATIONS http://code.google.com/p/randoop, "randoop—Random test generation—Google Project Hosting", downloaded Apr. 22, 2014, 3 pages.

http://www.eclipseonetips.com/2010/02/24/Junit-testing-made-easier-wity-eclipse-templates, "JUnit testing made easier with Eclipse templates | Eclipse on E", downloaded Apr. 22, 2014, 3 pages.

http://agitar.com/pdf/AgitarOneJunitGeneratorDatasheet, "AgitarOne JUnit Generator: Prevent Regressions and Cut the Maintenance Cost of Your Java Applications", Jul. 20, 2011, 4 pages.

http://www-03.ibm.com/software/products/en/functional, "Rational Functional Tester—Automated functional testing and regression testing software", downloaded Apr. 22, 2014, 2 pages.

* cited by examiner

```
public String getFirstName (String userId) {
    String firstName;
    // Code here that goes into the database and gets the user's
    first name
    return firstName;
}
```

| Method Called | Parameter(s) | Return Value |
|---|---|---|
| getFirstName | userId: BestUserEver | Jane |

```
public void testGetFirstName () {
    UserProfile profile = new UserProfile();
    assertEquals ("Jane", profile.getFirstName("BestUserEver"));
}
```

FIG. 7

GENERATION OF AUTOMATED UNIT TESTS FOR A CONTROLLER LAYER SYSTEM AND METHOD

RELATED APPLICATIONS

The subject application is a continuation application of U.S. patent application Ser. No. 14/454,236, filed on Aug. 7, 2014, the entire content of which is herein incorporated by reference.

BACKGROUND

A common design pattern for developing software applications may include the "model, view, controller" pattern. For example, the model may include the data, the view may include how the user interacts with the software application, and the controller may include the middle logic or service layer that the view may call to interact with the model. Users (e.g., software developers) working on a software application using the above-noted model, view, controller pattern may be unaware if they make a change to the controller how it may affect various pieces of the view. Unit tests may be created to ensure that code in the controller layer continues to behave correctly.

BRIEF SUMMARY OF DISCLOSURE

In one implementation, a method, performed by one or more computing devices, may include but is not limited to receiving, by a computing device, a selection of one or more files for which to have one or more automated unit tests generated for an application under test. An action in the application under test may be received while the application under test is used. Behavior data of how the application under test responds to the action may be tracked. An automated unit test of the one or more automated unit tests may be generated for underlying code of the application under test invoked when receiving the action based upon, at least in part, the behavior data of how the application under test responds to the action.

One or more of the following features may be included. It may be determined that the behavior data of how the application under test responds is unexpected and at least a portion of the behavior data may be removed in response to determining that the behavior data of how the application under test responds is unexpected. It may be determined that the behavior data of how the application under test responds is as expected, wherein the automated unit test for the underlying code of the application under test invoked may be generated based upon determining that the behavior data of how the application under test responds is as expected. The behavior data of how the application under test responds may include at least one method called in response to receiving the action in the application under test. The behavior data of how the application under test responds may include at least one of a value and an object passed into the at least one method called in response to receiving the action in the application under test. The behavior data of how the application under test responds may include at least one of a value and an object returned by the at least one method called in response to receiving the action in the application under test. The automated unit test may call the at least one method using identical parameters used in response to receiving the action in the application under test.

In another implementation, a computer program product resides on a computer readable storage medium that has a plurality of instructions stored on it. When executed by a processor, the instructions cause the processor to perform operations that may include but are not limited to receiving a selection of one or more files for which to have one or more automated unit tests generated for an application under test. An action in the application under test may be received while the application under test is used. Behavior data of how the application under test responds to the action may be tracked. An automated unit test of the one or more automated unit tests may be generated for underlying code of the application under test invoked when receiving the action based upon, at least in part, the behavior data of how the application under test responds to the action.

One or more of the following features may be included. It may be determined that the behavior data of how the application under test responds is unexpected and at least a portion of the behavior data may be removed in response to determining that the behavior data of how the application under test responds is unexpected. It may be determined that the behavior data of how the application under test responds is as expected, wherein the automated unit test for the underlying code of the application under test invoked may be generated based upon determining that the behavior data of how the application under test responds is as expected. The behavior data of how the application under test responds may include at least one method called in response to receiving the action in the application under test. The behavior data of how the application under test responds may include at least one of a value and an object passed into the at least one method called in response to receiving the action in the application under test. The behavior data of how the application under test responds may include at least one of a value and an object returned by the at least one method called in response to receiving the action in the application under test. The automated unit test may call the at least one method using identical parameters used in response to receiving the action in the application under test.

The details of one or more implementations are set forth in the accompanying drawings and the description below. Other features and advantages will become apparent from the description, the drawings, and the claims.

BRIEF DESCRIPTION OF THE DRAWINGS

FIG. 5 is an illustrative example file that may be used by the generation process of FIG. 1 according to one or more implementations of the present disclosure;

FIG. 6 is an illustrative behavior data example that may be used by the generation process of FIG. 1 according to one or more implementations of the present disclosure; and FIG. 7 is an illustrative automated unit test example that may be used by the generation process of FIG. 1 according to one or more implementations of the present disclosure.

Like reference symbols in the various drawings indicate like elements.

DETAILED DESCRIPTION

Figure 1:
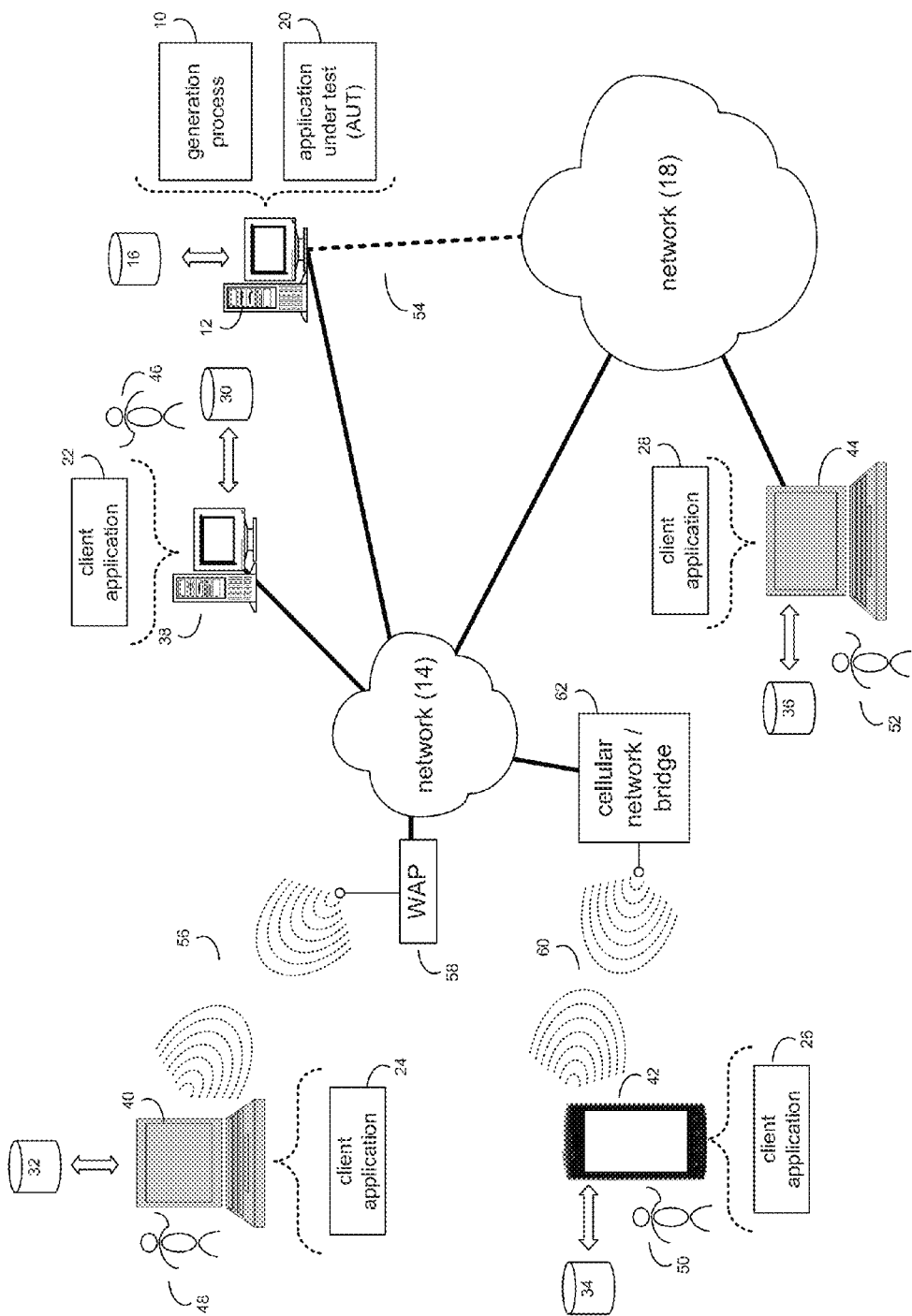
FIG. 1 is an illustrative diagrammatic view of a generation process coupled to a distributed computing network according to one or more implementations of the present disclosure.

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an aspect oriented programming language, an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown generation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, generation process 10 may receive, by a computing device, a selection of one or more files for which to have one or more automated unit tests generated for an application under test. An action in the application under test may be received while the application under test is used. Behavior data of how the application under test responds to the action may be tracked. An automated unit test of the one or more automated unit tests may be generated for underlying code of the application under test invoked when receiving the action based upon, at least in part, the behavior data of how the application under test responds to the action.

The instruction sets and subroutines of generation process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triplestore database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Generation process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute an application under test (AUT) (e.g., AUT 20), examples of which may include, but are not limited to, e.g., a web conferencing application, a video conferencing application, a voice-over-IP application, a video-over-IP application, Instant Messaging (IM)/"chat" application, or other application that may interact with a software development application. Generation process 10 and/or AUT 20 may be accessed via client applications 22, 24, 26, 28. Generation process 10 may be a stand alone application, or may be an applet/application/script/extension that may interact with and/or be executed within AUT 20, a component of AUT 20, and/or one or more of client applications 22, 24, 26, 28. AUT 20 may be a stand alone application, or may be an applet/application/script/extension that may interact with and/or be executed within generation process 10, a component of generation process 10, and/or one or more of client applications 22, 24, 26, 28. One or more of client applications 22, 24, 26, 28 may be a stand alone application, or may be an applet/application/script/extension that may interact with and/or be executed within and/or be a component of generation process 10 and/or AUT 20. Examples of client applications 22, 24, 26, 28 may include, but are not limited to, e.g., a web conferencing application, a video conferencing application, a voice-over-IP application, a video-over-IP application, Instant Messaging (IM)/"chat" application, or other application that may interact with a software development application, a software development application, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of generation process 10 (and vice versa). Accordingly, generation process 10 may be a purely server-side application, a purely client-side application, or a hybrid server-side/client-side application that is cooperatively executed by one or more of client applications 22, 24, 26, 28 and/or generation process 10.

One or more of client applications 22, 24, 26, 28 may be configured to effectuate some or all of the functionality of AUT 20 (and vice versa). Accordingly, AUT 20 may be a purely server-side application, a purely client-side application, or a hybrid server-side/client-side application that is cooperatively executed by one or more of client applications 22, 24, 26, 28 and/or AUT 20. As one or more of client applications 22, 24, 26, 28, generation process 10, and AUT 20, taken singly or in any combination, may effectuate some or all of the same functionality, any description of effectuating such functionality via one or more of client applications 22, 24, 26, 28, generation process 10, AUT 20, or combination thereof, and any described interaction(s) between one or more of client applications 22, 24, 26, 28, generation process 10, AUT 20, or combination thereof to effectuate such functionality, should be taken as an example only and not to limit the scope of the disclosure.

Users 46, 48, 50, 52 may access computer 12 and generation process 10 (e.g., using one or more of client electronic devices 38, 40, 42, 44) directly through network 14 or through secondary network 18. Further, computer 12 may be connected to network 14 through secondary network 18, as illustrated with phantom link line 54. Generation process 10 may include one or more user interfaces, such as browsers and textual or graphical user interfaces, through which users 46, 48, 50, 52 may access generation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
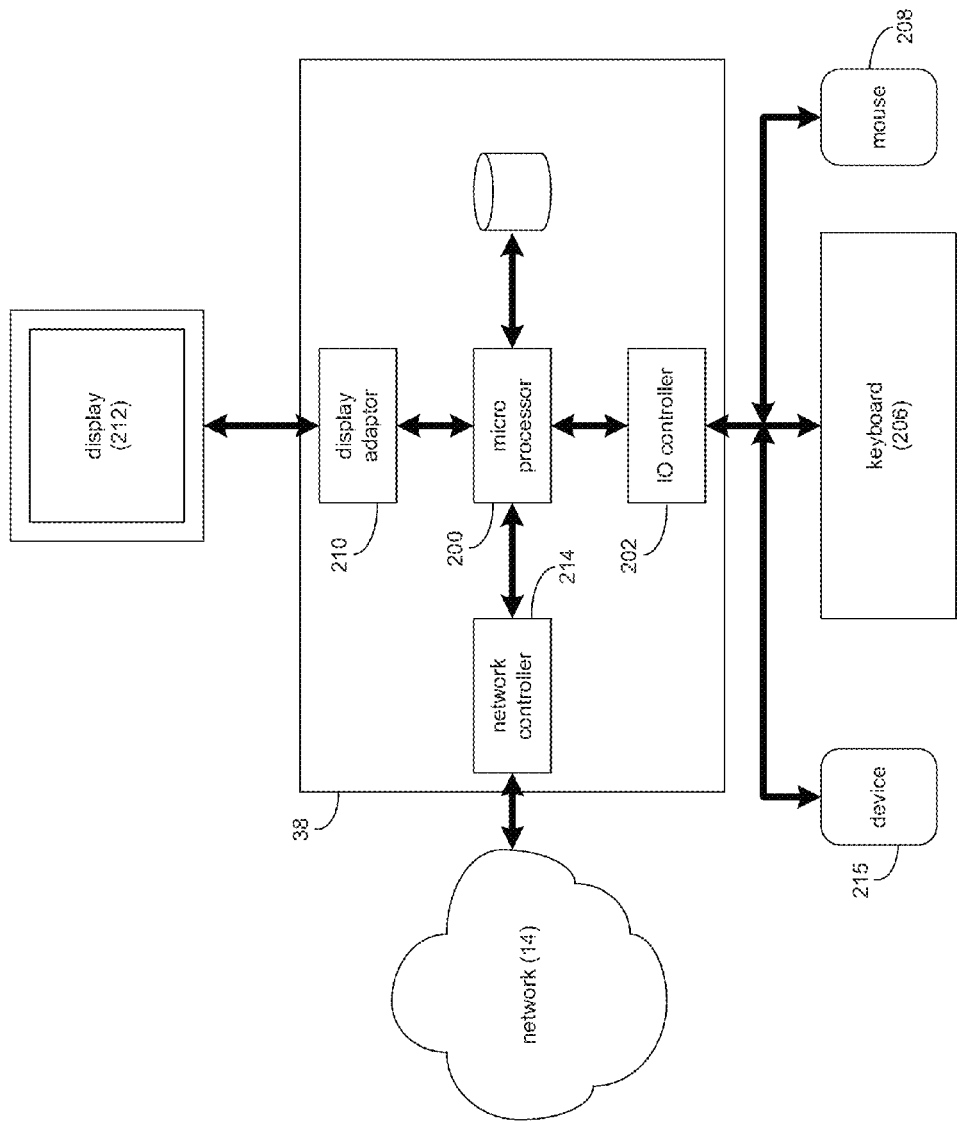
FIG. 2 is a diagrammatic view of a client electronic device of FIG. 1 according to one or more implementations of the present disclosure.
Figure 3:
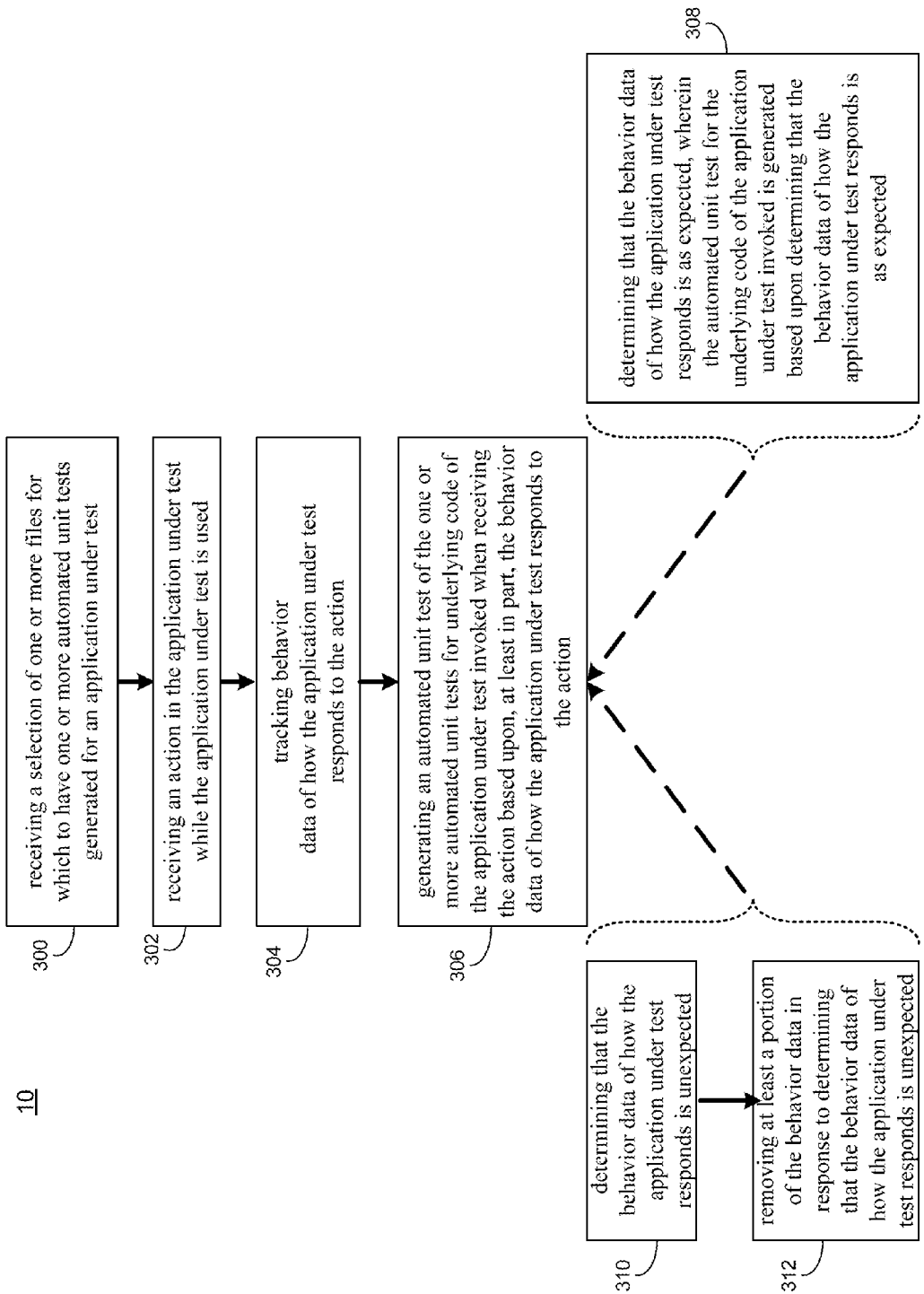
FIG. 3 is an illustrative flowchart of the generation process of FIG. 1 according to one or more implementations of the present disclosure.
Figure 4:
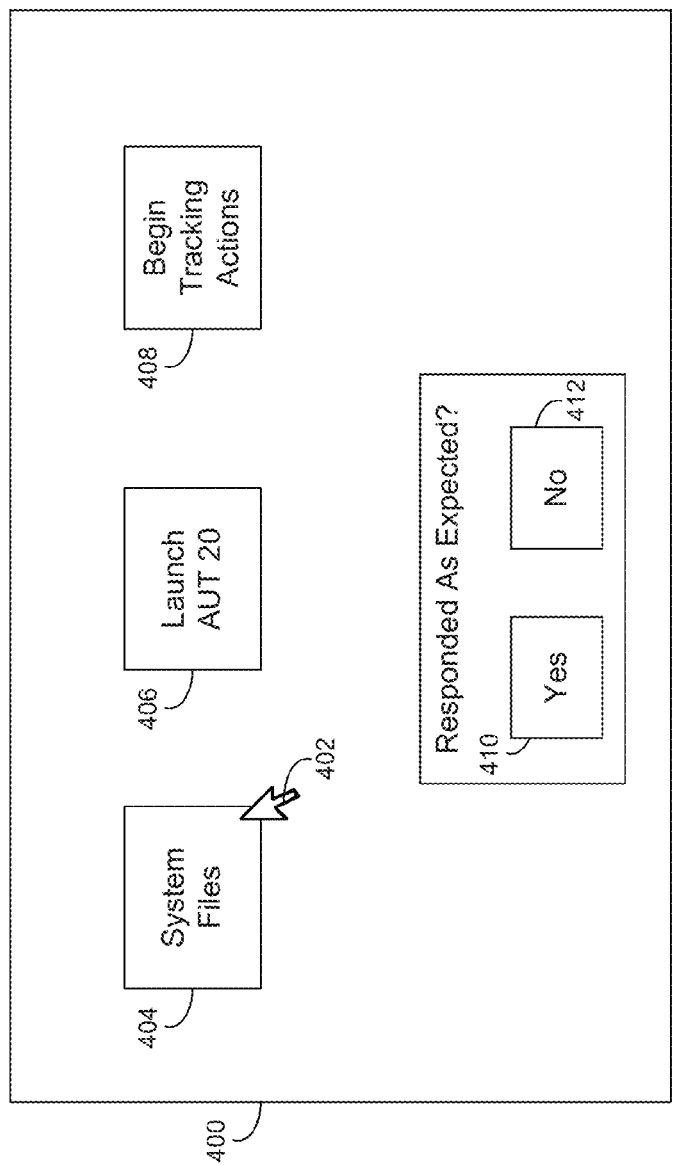
FIG. 4 is an illustrative diagrammatic view of a screen image displayed by the generation process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, generation process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Generation Process:

As discussed above and referring also at least to FIGS. 3-7, generation process 10 may receive 300, by a computing device, a selection of one or more files for which to have one or more automated unit tests generated for an application under test. Generation process 10 may receive 302 an action in the application under test while the application under test is used. Behavior data of how the application under test responds to the action may be tracked 304 by generation process 10. Generation process 10 may generate 306 an automated unit test of the one or more automated unit tests for underlying code of the application under test invoked when receiving 302 the action based upon, at least in part, the behavior data of how the application under test responds to the action.

As noted above, a common design pattern for developing software applications may include the "model, view, controller" pattern. For example, the model may include the data, the view may include how the user interacts with the software application, and the controller may include the middle logic or service layer that the view may call to interact with the model. Users (e.g., software developers) working on a software application using the above-noted model, view, controller pattern may be unaware if they make a change to the controller how it may affect various pieces of the view.

Automated unit tests may be created to ensure that code in the controller layer continues to behave correctly. However, for a large code base that may not have any existing automated unit tests, the software developers may feel uncertain if the changes being made to the controller layer will break pieces of the view, and creating a solid unit test case suite from scratch may be onerous. Since view test automation may be brittle, creating test automation for the controller layer may be a more valuable investment. For instance, assume for example purposes only that a software developer (e.g., user 46) recently joined the APPLICATION EXAMPLE team for AUT 20. The AUT 20 code base may, e.g., be very large, have no automated testing, and/or use the model, view, controller design pattern. It may take user 46 months to learn and become completely comfortable with the code base, and, even then, user 46 may make a change to the controller layer and overlook a way that one piece of the view was expecting the controller to behave. In this example, user 46 may break functionality in the view and introduce defects into AUT 20.

Thus, in some implementations, generation process 10 may automatically generate automated unit tests for, e.g., the controller layer by invoking the view layer. As opposed to generating automated unit tests by performing static analysis of the code base and how to record tests of the higher-level view layer, generation process 10 may generate automated unit tests for the underlying code that is actually being invoked when AUT 20 is in use.

For example, in some implementations, generation process 10 may receive 300, by a computing device, a selection of one or more files for which to have one or more automated unit tests generated for an application under test. For instance, generation process 10 may include a user interface, such as the example and non-limiting user interface 400 shown in FIG. 4. In the example, user interface 400 may include a code editor (not shown) and other functionality similarly known to those skilled in the art for developing software applications, such as example AUT 20. Further in the example, generation process 10 may receive 300 (e.g., via user cursor 402) a selection of the files (e.g., via object 404) for which generation process 10 is to have automated unit tests generated (e.g., files that may be part of the controller portion of AUT 20 that indicate generation process 10 should track 304 those files to generate 306 automated unit tests). An example of a file (e.g., UserProfile.java) may include an example method (e.g., method 500) like that shown in FIG. 5.

Further assume in the example that generation process 10 receives (e.g., via user cursor 402) a user input to launch AUT 20 (e.g., via object 406). Further assume in the example that generation process 10 receives (e.g., via user cursor 402) a user input for generation process 10 to begin tracking behavior data of AUT 20 (e.g., via object 408).

In some implementations, generation process 10 may receive 302 an action in the application under test while the application under test is used. For instance, assume for example purposes only that as user 46 uses AUT 20, user 46 uses cursor 402 to, e.g., click an option or type something into a dialogue box (not shown). For example, and referring now at least to example FIG. 6, user 46 (via generation process 10) may receive 302 an action to access, e.g., BestUserEver's profile page in AUT 20, and the user's name (e.g., Jane Jones) may be displayed on the page of AUT 20. Generation process 10 may track 304 information (e.g., behavior data) about the code that was called to access BestUserEver's profile page in AUT 20 and may store the example behavior data (e.g., behavior data 600) shown in FIG. 6.

In some implementations, as noted above, behavior data of how the application under test responds to the action may be tracked 304 by generation process 10. For instance, the behavior data of how AUT 20 responds may include at least one method called in response to receiving 302 the action in AUT 20 (e.g., what methods (or functions) in the code for AUT 20 are called in response to the above-noted received 302 action). As another example, the behavior data of how AUT 20 responds may include at least one of a value and an object passed into the at least one method called in response to receiving 302 the action in AUT 20. As yet another example, the behavior data of how AUT 20 responds may include at least one of a value and an object returned by the at least one method called in response to receiving 302 the action in AUT 20. In some implementations, aspect oriented programming methods may be used by generation process 10 to insert observer code to track 304 each method's interaction with its own object and objects that are passed to it.

In some implementations, generation process 10 may generate 306 an automated unit test of the one or more automated unit tests for underlying code of AUT 20 invoked when receiving 302 the action based upon, at least in part, the behavior data of how the application under test responds to the action. For example, generation process 10 may determine 308 that the behavior data of how AUT 20 responds is as expected, wherein the automated unit test for the underlying code of AUT 20 invoked may be generated 306 based upon determining 308 that the behavior data of how the application under test responds is as expected. For instance, assume for example purposes only that user 46 believes that AUT 20 behaved as expected. In the example, generation process 10 may receive (e.g., via user cursor 402) a user input to indicate that user 46 believes that AUT 20 behaved as expected (e.g., via object 408). For example, if AUT 20 behaved as expected, generation process 10 may generate 306 automated unit tests that duplicate the above-noted information (i.e., behavior data) that was tracked 304, like the example automated unit test (e.g., automated unit test 700) shown at FIG. 7.

In the example, user 46 (via generation process 10) may now run automated unit tests, such as automated unit test 700, that were generated 306 whenever user 46 makes changes to the code base of AUT 20. Because the automated unit tests are testing code that is lower than the frequently changing and commonly brittle view, the automated unit tests may be more stable. Once user 46 (via generation process 10) has generated 306 automated unit tests for the common functions in the view, changes made to the controller are not likely to introduce defects in the view in those areas. In some implementations, user 46 (via generation process 10) may run these automated unit tests at any time to check for regressions. In some implementations, generation process 10 may remove any duplicate automated unit tests.

In some implementations, the automated unit test may call the at least one method using identical parameters used in response to receiving 302 the action in AUT 20. For example, generation process 10 may generate 306 an automated unit test for every time a method was called in response to receiving 302 the action in AUT 20. The automated unit test (via generation process 10) may call the function using the same parameters that were used when user 46 took the action that was received 302. The automated unit test (via generation process 10) may verify that the return value is the same value that was returned when user 46 took the action that was received 302. The automated unit test (via generation process 10) may also make assertions about the method's interactions with the objects that were passed as parameters or the state of the object that the method operates on.

In some implementations, generation process 10 may determine 310 that the behavior data of how the application under test responds is unexpected and at least a portion of the behavior data may be removed 312 by generation process 10 in response to determining 310 that the behavior data of how the application under test responds is unexpected. For instance, assume for example purposes only that user 46 believes that AUT 20 did not behave as expected (e.g., the return value is not the same value that was returned when user 46 took the action that was received 302). In the example, generation process 10 may receive (e.g., via user cursor 402) a user input to indicate that user 46 believes that AUT 20 did not behave as expected (e.g., via object 412). In some implementations, if AUT 20 did not behave as expected, generation process 10 may remove the behavior data tracked 304.

In some implementations, generation process 10 may track 304 the runtime data over time by observing an actively used test system (e.g., generation process 10). For example, statistical analysis may then be performed on the data collected over time to generate 306 useful typical and edge cases. For instance, if a method accepts a string, the data collected over time may allow user 46 to understand what is the length of a typical string, as well as what may be the extreme cases for which may need to be tested.

While one or more implementations may include user action (e.g., via cursor 402 and user interface 400), it will be appreciated that any of the user action may be automated by generation process 10. For example, determining 308 that the behavior data of how the application under test responds may be accomplished automatically by generation process 10, rather than requiring an input from user 46 as described above. As another example, the behavior data may be tracked 304 automatically at any point (e.g., while the application under test is being executed) rather than requiring an input from user 46 as described above. As such, any description of using a user's input should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   Receiving, by a computing device, a selection of one or more files for which to have one or more automated unit tests generated for an application under test;
   receiving an action in the application under test while the application under test is used;
   tracking behavior data of how the application under test responds to the action
   wherein tracking is performed by inserting observer code using aspect oriented programming method, which tracks each method's interaction with its own objects and objects that are passed to it;
   determining that the behavior data of how the application under test responds is unexpected, and removing at least a portion of the behavior data and
   generating an automated unit test of the one or more automated unit tests for underlying code of the application under test invoked when receiving the action based upon, at least in part, the behavior data of how the application under test responds to the action.

2. The computer-implemented method of claim 1 further comprising:
   determining that the behavior data of how the application under test responds is as expected, wherein the automated unit test for the underlying code of the application under test invoked is generated based upon determining that the behavior data of how the application under test responds is as expected.

3. The computer-implemented method of claim 1 wherein the behavior data of how the application under test responds includes at least one method called in response to receiving the action in the application under test.

4. The computer-implemented method of claim 3 wherein the behavior data of how the application under test responds includes at least one of a value and an object passed into the at least one method called in response to receiving the action in the application under test.

5. The computer-implemented method of claim 3 wherein the behavior data of how the application under test responds includes at least one of a value and an object returned by the at least one method called in response to receiving the action in the application under test.

6. The computer-implemented method of claim 3 wherein the automated unit test calls the at least one method using identical parameters used in response to receiving the action in the application under test.

* * * * *